INVENTOR.
RONALD R. O'HARA
BY George A. Woodruff

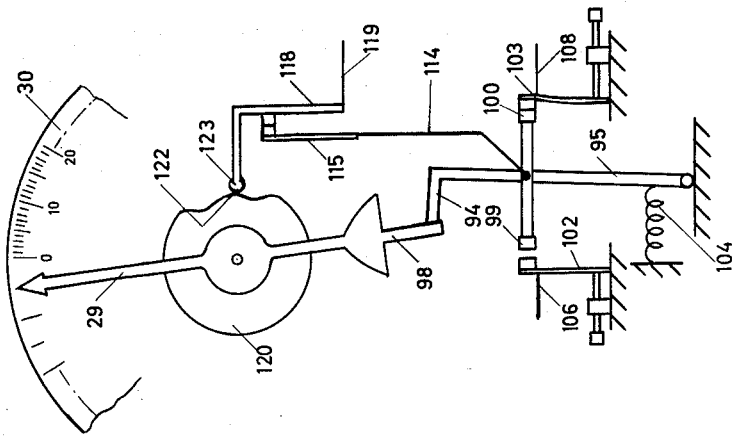
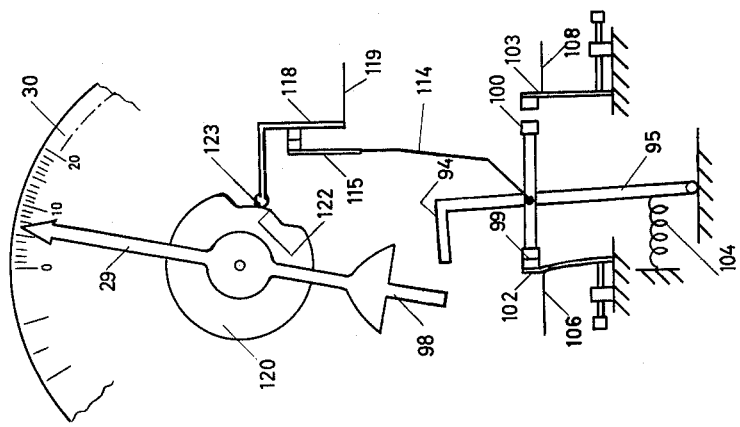

United States Patent Office 3,239,759
Patented Mar. 8, 1966

3,239,759
AUTOMATIC REBALANCING MEASURING SYSTEM HAVING AUXILIARY ACTUATED INDICATOR ZERO RETURN MEANS
Ronald R. O'Hara, Geneseo, Ill., assignor, by mesne assignments, to Fairbanks Morse Inc., New York, N.Y., a corporation of Delaware
Filed July 31, 1962, Ser. No. 213,651
7 Claims. (Cl. 324—99)

This invention relates to improvements in condition measuring and indicating systems of a character affording an electrical system for sensing conditions to be measured, as weight, pressure, etc. and effecting indications of condition sensed values as upon a graduated dial and pointer unit. More particularly, the invention concerns the provision for a system of the kind indicated, of improved means for assuring a null or zero balanced condition of the system following condition measuring, and coincidentally therewith location of the indicator dial pointer at true zero position.

Typical of electrical measuring systems of the kind here concerned is one which provides a condition sensing device as a load cell for example, a dial and pointer unit, and electrical network means including a potentiometer type balance network, phase sensitive amplifier means and reversible servo motor means in operative connection to the balance network potentiometer and the dial pointer, wherein the network means serves to translate the load cell output (which is proportional to the value of the condition under measurement) to servo motor operation such as to locate the dial pointer in a position indicating the value of the condition under measurement. Removal of a condition under measurement from the sensing device results in reverse operation of the servo motor such as to return the dial pointer to zero position. However, electrical systems of this character are subject to hysteresis and electrical drift effects which generally result in off-balance conditions of the system, such off-balance appearing at the dial indicator following condition sensing operation, in that the dial pointer is returned only to an off-zero position on one side or the other of its true zero position relative to the dial scale.

Accordingly, the principal object of the present invention is to afford means for correcting the system in a manner to compensate for the indicated error producing effects, wherein the system correcting means is controlled by the dial pointer.

Another object is to provide a dial pointer controlled off-balance correction means for a measuring system as indicated, which assures return of the dial pointer to true zero position after each measuring operation.

A further object is to afford an improved and highly effective off-balance correction provision which is relatively simple such as to enable ready application thereof to existing measuring systems.

The foregoing and other objects and advantages provided by the present invention will appear from the following description of a preferred embodiment thereof as illustrated in the accompanying drawings, wherein:

FIG. 2 is a fragmentary view of the dial and pointer assembly together with pointer controlled elements of the off-balance correction means forming the subject of the present invention, the pointer and controls being shown in one off-zero position of the pointer, and FIG. 3 is a view corresponding to the view of FIG. 2, but showing the pointer in an opposite off-zero position.

Figure 1:
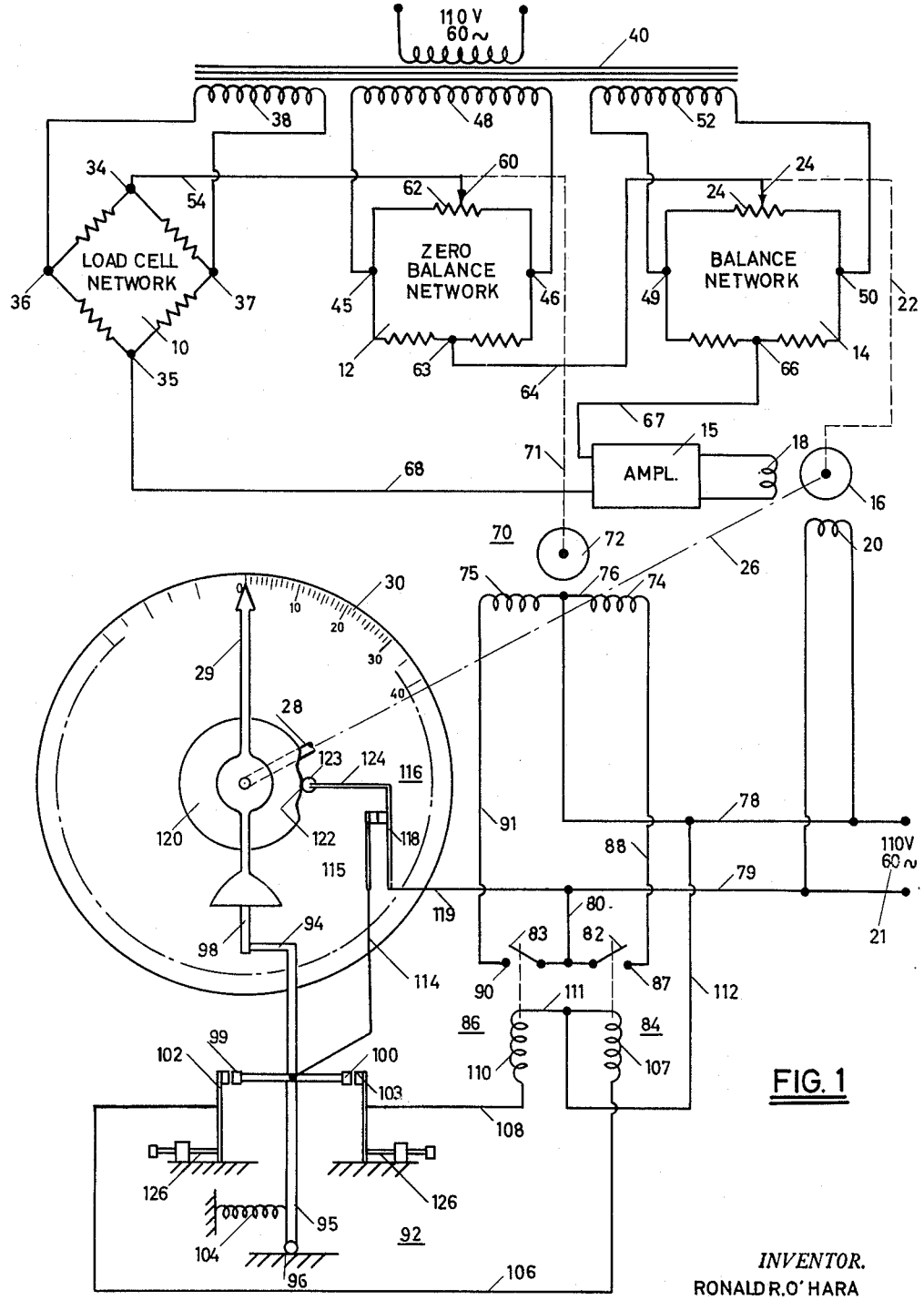
FIG. 1 illustrates by circuit diagram, an electrical measuring and indicating system including a dial and pointer unit and the off-balance correction control provision afforded by this invention.

Referring to FIG. 1, the measuring and indicating system to which the present invention is applied as a presently preferred example, includes a load cell network 10, a zero balance network 12 (hereinafter to be referred to more particularly), a balance network 14 of variable potentiometer type, a phase sensitive amplifier 15 and a reversible electric servo motor 16 having its control winding 18 connected to the output of amplifier 15 and a reference winding 20 energized from a voltage source 21. Servo motor 16 is operatively connected by connection indicated at 22, to the variable contact member 24 of the balance network potentiometer 25, and also is connected by drive connection indicated at 26 to the pointer shaft 28 of the indicator member or dial pointer 29, the latter cooperating with the graduated dial scale indicated at 30. The condition sensing means of the system is represented by the load cell network 10, and such means may be of any well known load cell construction suitable to the character of conditions to be measured, as weight, pressure or the like, and operating to produce at the output terminals 34 and 35 of its network 10 an output voltage which is proportional to the value of the condition under measurement in application to the sensing means. The load cell network input terminals 36 and 37 are connected as shown to a fixed input voltage source provided through the secondary winding 38 of a power supply transformer 40. Similarly, the input terminals 45 and 46 of zero balance network 12 are connected to fixed voltage supply secondary 48, and the input terminals 49 and 50 of balance network 14 are connected to the fixed voltage source provided by transformer secondary winding 52.

A conductor 54 connects the output terminal 34 of load cell network 10 to the adjustable contact 60 of the potentiometer control 62 included in the zero balance network 12. The output terminal 63 of zero balance network 12 is in turn connected by conductor 64 to the potentiometer contact 24 of balance network 14. The output terminal 66 of balance network 14 is connected by conductor 67 to one input terminal of the amplifier 15, while the other amplifier input terminal is connected by conductor 68 to output terminal 35 of load cell network 10.

A measuring and indicating system as shown and thus far described (except for the off-balance correction provision associated with zero balance network 12 as will hereinafter appear) is well known and, in general, is similar to the system disclosed in Lauler and Thorsson Patent 2,882,035 to which reference may be made for a complete disclosure of the operation of the system. However, it is pointed out here that the electrical network system serves to translate the output voltage developed by the load cell sensing means (represented by network 10) in response to the application thereto of a condition to be measured, to an unbalance voltage at the control winding 18 of servo motor 16. The servo motor 16 in response to such unbalance voltage at its control winding operates in one direction to actuate potentiometer contact 24 of balance network 14 such as to reduce the unbalance voltage at winding 18 to a null voltage, when the servo motor stops. Coincidentally with potentiometer operation, the servo motor drives the indicator pointer from the zero position shown to a position on the dial scale 30 indicating the value of the condition under measurement. Thereafter upon removal of the condition under measurement from the sensing device, the condition proportional output voltage at network 10 is thereby reduced to a null voltage. The counter voltage then remaining at the output of balance network 14, results in an unbalance voltage of opposite phase at control winding 18, such unbalance voltage causing servo motor operation of the potentiometer contact 24 in reverse direction until the unbalance voltage is reduced to null voltage when the servo motor stops. In so operating, the servo motor 16 returns the dial pointer 29 toward and normally to its zero position as shown in FIG. 1.

As hereinbefore indicated, an electrical system of this kind is subject to certain unbalancing effects such as hysteresis and electrical drift effects, which when occurring will cause null voltage at the control winding 18 and resultant stopping of the servo motor when the pointer has not been fully returned to its true zero position. Depending upon the extent and character of the off-balance producing effects, such as electrical drift and the like, the pointer may be stopped anywhere in an off zero range which may be small but appreciable in visual observations of the pointer position. Thus, as shown in FIG. 2, the pointer may be stopped short of its true zero position to the extent of a few graduations of the dial scale, or it may over-shoot the zero position to the extent of a few graduations as illustrated in FIG. 3. Obviously, unless such off zero condition be corrected, the succeeding measuring operation may result in an erroneous indication of the measurement value to an extent proportional to the off zero condition of the pointer which, of course, reflects an off-balance condition of the electrical system.

Turning now to the provision for restoring the system to null balance condition with the indicator pointer 29 at true zero position when the load cell output is zero (no condition then under measurement), such provision in presently preferred form is illustrated schematically in FIG. 1. As there shown, a reversible electric motor means 70 is provided for operating the movable contact 60 of zero balance network potentiometer 62, a suitable drive connection being made, as indicated by the broken line 71, from the motor rotor 72 to movable contact 60. The motor includes a pair of field windings 74 and 75 in series connection at 76, one field for effecting one direction of motor rotation and the other field for effecting motor rotation in the opposite direction. To the field series connection 76 is connected one line 78 from the power source 21, the other line 79 from source 21 being connected by lead 80 to the movable contacts 82 and 83 of respective electromagnetic relay switches 84 and 86. Stationary contact 87 of relay 84 is connected by lead 88 to motor field winding 74, while stationary contact 90 of relay 86 is similarly connected by lead 91 to the other field winding 75. Actuation of the relay switches 84 and 86 for determining operation of motor 70 with its rotor 72 turning in one direction or the other, is here effected by switch means controlled by the indicator pointer 29 as will presently appear.

A suitable switch unit 92 is positioned relative to the indicator 29 such that the free end 94 of its movable switch member 95 pivotally supported at 96, is located for actuating engagement by the pointer tail end 98 when the pointer is moved to zero position (FIG. 1) or within a relatively close range on either side of zero position, as this will appear more fully hereinafter. Member 95 carries switch contacts 99 and 100 on opposite sides thereof, for cooperation respectively with suitably mounted spring contacts 102 and 103, the member being biased by a suitable light spring 104 toward engagement of its contact 99 with spring contact 102. Contact 102 is connected by a lead 106 to the operating coil 107 of relay 84, and contact 103 connected by lead 108 to operating coil 110 of relay 86. The relay coils are in series connection at 111, from which series connection extends lead 112 to the power source line 78. Completing the relay energizing circuit through switch unit 92, the movable switch member 95 of the latter is connected by lead 114 to spring contact 115 of a suitable control switch 116 which may be of micro-switch type, having its movable switch contact 118 connected by lead 119 to opposite power line 79.

Control switch 116 is disposed adjacent a cam member 120 fixed on the pointed shaft 28, the cam having a circular periphery of uniform radius except for a depression 122 of limited angular extent. Engaging the cam is the roller element 123 of cam-follower extension 124 of the movable switch contact 118, the latter being suitably biased (not shown) to maintain cam engagement of its follower. The cam and control switch are positionally related to the pointer 29, while the cam depression 122 is of predetermined angular extent, such that the cam follower roller 123 will be in the depression 122 (thus closing the control switch contacts 115–118) only when the pointer 29 is within a predetermined angular range spanning zero position. For example, the arcuate extent of the cam depression may be such that switch 116 will be closed in any position of the pointer along an arc spanning zero, between a point on scale 30 say 20 graduations up-scale from zero and a point behind zero to an extent equivalent to 20 graduations or some lesser number of graduations. Thus, switch 116 is closed to condition the circuit and switch 92 for energization of the relays 84–86 only when the pointer is in the indicated range, the cam 120 in all other positions of the pointer maintaining the switch 116 open to render the relay control circuit ineffective.

Assume the condition of the measuring system and zero control provision to be as shown in FIG. 1, wherein there is no condition then under measurement, switch 116 is closed, and the pointer 29 is at true zero position. In that position of the pointer, its tail 98 in engagement with end 94 of switch member 95, locates the member in centered position between the spring contacts 102 and 103 with its contacts 99 and 100 in open-circuit relation to the latter. Consequently, the relays 84–86 will be in de-energized condition with their switch elements 82–83 open, and the motor 70 in stopped condition. It is to be noted here that the open-circuit position of the spring contacts 102 and 103 relative the contacts 99 and 100 of member 95 when so centered by the pointer, may be adjusted toward or away from the latter, effected by suitable adjustment screws 126, so that contact 99 just engages contact 102 when the pointer is off-zero on the up-scale side to the extent of say ½ to 1 graduation, and so that contact 100 just engages contact 103 when the pointer is off-zero on the opposite or behind zero side to about the same extent.

Now upon load cell response to a condition to be measured, the measuring system operates as hereinbefore described, with the servo motor 16 driving the indicator pointer up-scale from zero position to a point on scale 30 indicating the value of the condition under measurement. As pointer 29 moves from zero position, its tail 98 frees the switch member 95 from its centered, open-circuit position, resulting in engagement of its contact 99 with spring contact 102 and maintenance of such engagement under the bias of member 95 by the spring 104. Consequently and until the pointer has been moved sufficiently to effect opening of switch 116 by cam 120, as until the pointer passes up-scale past the 20th graduation from zero, an energizing circuit is completed through switches 116 and 92 (at contacts 99–102) to the relay coil 84. The latter then closes its contact 82 on contact 87 to effect energization of motor field 74, causing motor operation to displace the potentiometer contact 60 of zero balance network 12 in one direction. The direction of potentiometer contact movement in this instance is such that were the measuring system at balance without a condition then under measurement and the pointer at zero position, an unbalance voltage would appear at control winding 18 of the servo motor and in such phase as to cause servo motor operation in the direction to displace the pointer back of zero position. To minimize and render negligible such error producing effect from the zero balance network in the initial phase of pointer displacement, the motor 70 is selected to have an operating speed which is a small fraction of that of the servo motor 16. For example, where the speed of motor 70 is 1 r.p.m. and that of servo motor 16 is such as to turn the pointer 29 at the rate of 26 r.p.m., it is determined that the error in condition measurement readings on the indicator is so light as to be negligible.

Upon completion of the measuring operation and removal of the condition under measurement from the sensing load cell 10, the resulting unbalance voltage of opposite phase at the servo motor winding 18 causes servo motor operation in the direction to return the pointer 29 toward zero. In so operating, the servo motor displaces the balance network potentiometer contact 24 to reduce the unbalance voltage to null voltage at winding 18, when the servo motor stops with the pointer 29 then expectedly at zero position. In such zero return of the pointer 29, the cam controlled switch 116 closes as the pointer passes the 20th graduation, thereby causing switch closure at relay 84 since contacts 99–102 are then closed, to energize winding 74 of zero correction motor 70. The resulting operation of motor 70 moves zero balance potentiometer contact 60 in the direction as before indicated, the effect of which is cumulative with servo motor operation of balance network potentiometer contact 24 to reduce the unbalance voltage at winding 18 to null voltage.

Assume in such return of the pointer 29 toward zero, that the system is then unbalanced due to hysteresis, electrical drift or other effects, with the extent of unbalance sufficient in the absence of the zero balance corrective provision here made, to result in null voltage at the servo motor control winding 18 when the servo motor has returned the pointer 29 only to say the 6th graduation upscale from zero as shown in FIG. 2. The off-zero position of the pointer then would indicate a false no-load balance condition of the system, and such is now avoided by the present provision.

Referring to FIG. 2 and in view of FIG. 1, as the servo motor 16 returns the pointer within the 20 graduation range from zero, the relay 84 is then energized through closed contacts 115–118 of switch 116 and closed contacts 99–102 of switch 92, to close its contacts 82–87 and energize field 74 of the zero correction motor 70. Motor 70 thus operates the contact 60 of potentiometer 62 in the direction before indicated, such as to introduce unbalance voltage at the servo motor control winding 18 for continuing servo motor operation to move the pointer toward zero position. Consequently, any tendency for the servo motor to stop with the pointer at the 6th graduation (FIG. 2) or any other graduation in the 20 graduation range referred to, because of false balance of the system, is here precluded. The slow turning motor 70 continues to cause servo motor return of the pointer 29 until the pointer tail 98 strikes the end 94 of switch arm 95 and moves the latter to open the contacts 99–102, when the relay 84 opens to de-energize field winding 74 and thus cause motor 70 to stop. Contact of the pointer tail 98 with end 94 of switch arm 95 here occurs when the pointer 29 is within 1 graduation of zero (preferably between ½ and 1 graduation), so that the motor 70 in stopping will cause servo motor 16 to bring the pointer to zero position as the servo motor comes to a stop under the then obtaining null unbalance voltage at its control winding 18. In that position, the pointer tail centers the switch arm 95 in open position relative to the opposite contacts 102 and 103.

Now, should the system be unbalanced due to hysteresis, drift, etc., in such extent as to cause servo motor return of the pointer 29 past zero to a back-of-zero position such as that illustrated in FIG. 3, the zero correction provision will function to correct this condition in the following manner. As the servo motor drives the pointer 29 to and behind zero, the pointer tail 98 actuates switch arm 95 in the direction to open contacts 99–102 and thence close contacts 100–103, the spring contact 103 yielding as the pointer swings behind zero so that the contacts remain closed. Since switch 116 is then closed, closure of contacts 100–103 completes the energizing circuit to coil 110 of relay 86, resulting in relay contact closure at 83–90 to effect energization of field 75 of the motor 70. The motor thereupon operates in reverse rotation to that described in connection with correction of the FIG. 2 condition, to move contact 60 of zero balance network potentiometer 62 in the direction to cause an unbalance voltage of reverse phase at the servo motor control winding 18. The servo motor 16 thus reverses rotation to bring the pointer 29 from behind zero (FIG. 3) to its zero position, the pointer tail then moving away from end 94 of the switch arm, but with the arm following the tail 98 under the bias of spring 104. When the pointer is within the equivalent of 1 graduation from zero position, switch arm contact 100 breaks engagement with contact 103 and thus opens the energizing circuit to relay 86 which then opens its contacts 83–90 to de-energize motor field 75. Motor 70 thereupon ceases operation, and in coming to a stop causes the servo motor 16 to return the pointer to its zero position (FIG. 1) wherein the pointer tail 98 centers the switch arm 95 in open position.

It will be appreciated now from the foregoing description that the present improvements afford an effective provision for correcting off-zero positioning of the indicator pointer due to measuring system unbalance because of hysteresis, electrical drift or other effects, and coincidentally adjusting the electrical system to compensate for such effects. Importantly here, the present zero correction provision functions, or is conditioned for functioning, after each and every measuring operation of the system when zero return is desired. It is to be noted also, that the character and relative simplicity of the present improvements are such as to facilitate ready application thereof to existing electrical measuring systems of the type here shown and the like.

Having now described and illustrated a presently preferred form of the invention, it is to be understood that various modifications may be made thereto without departing from the spirit and scope of the invention as hereinafter claimed:

What I claim is:

1. In a condition measuring and indicating system including indicator means having an indicator member movable relative to a zero position, and condition measuring means of electrical network character connected to said indicator member and operable responsively to a condition under measurement in application thereto for moving said member to a position indicating the value of the condition under measurement, said condition measuring means being operable in response to removal of the condition under measurement therefrom to return said indicator member to zero position and being subject to electrical error off-balance resulting in indicator return to an off-zero position; the combination therewith of adjustable error off-balance compensating control means for said condition measuring means effective through adjustment thereof to determine the terminal extent of operation of said condition measuring means in returning the indicator member to zero position, such as to effect location of the indicator member in true zero position, and means controlled by said indicator member and operable for effecting adjustment of said control means only when the indicator member is in a predetermined off-zero range.

2. In a condition measuring and indicating system having condition sensing means, indicator means including an indicator member movable relative to a zero position for indicating values of conditions under measurement, electrical means including a reversible electric motor in drive connection to said indicator member, said electrical means being responsive to said sensing means in sensing a condition under measurement for effecting motor drive of said indicator member to a position indicating the value of the condition under measurement, the electrical means further being responsive to said sensing means upon removal of the condition under measurement therefrom for effecting motor drive of said indicator member to its zero position and being subject to electrical error off-balance resulting when occurring, in motor drive of the indicator member to an off-zero position; the combination therewith of electrical error off-balance compensating means for said electrical means having an adjustable device operable for causing motor drive of said indicator member from off-zero to true zero position, operating means for said adjustable device including second motor means in operative connection to the adjustable device, and control means under control by said indicator member and responsive to an off-zero position of the member, to cause operation of said second motor means, 3. In a condition measuring and indicating system having condition sensing means for producing an output voltage the magnitude of which is proportional to the value of the condition under measurement, electric motor means having a control winding and operable in response to energization of said control winding, electrical means for translating said output voltage to an unbalance voltage at said control winding for causing motor operation, said electrical means including a balancing network having a control device operable by said motor for effecting reduction of said unbalance voltage at the motor control winding to null voltage and thereby de-energize the control winding, the extent of motor operation in operating said control device to effect said null voltage at the motor control winding being proportional to the value of the condition under measurement, indicator means including an indicator member movable relative to a zero position and positionable by said electric motor means according to the extent of motor operation, to indicate the value of the condition under measurement, said electrical means in response to null output voltage of said sensing means consequent to removal of the condition under measurement from the sensing means, causing operation of said electric motor means to return said indicator member to the zero position, said electrical means further including a zero balance network having an adjustable device for conditioning the electrical means to cause motor positionment of the indicator member in true zero position following removal of the condition under measurement from the sensing means, operating means for said adjustable device, and means for causing operation of said operating means when said indicator member is in a predetermined off-zero range.

4. In a condition measuring and indicating system, indicator means having an indicator member movable relative to a zero position, electrical network means including a condition sensing means and reversible motor means in operative connection to said indicator member, effective upon sensing of a condition under measurement by said sensing means to produce operation of said reversible motor means in the direction to move said indicator member to a position indicating the value of the condition under measurement, and effective upon removal of the condition under measurement from said sensing means to produce operation of said reversible motor means in the direction to return the indicator member to zero position, said electrical network means further including a zero balance network having an adjustable device effective by adjustment of the latter for conditioning the network means to cause motor positionment of the indicator cator member in true zero position following removal of the condition under measurement from said sensing means, second motor means for operating said adjustable device, and means under control of said indicator member for causing operation of said second motor means only when the indicator member is in a predetermined off-zero range.

5. In a condition measuring and indicating system, indicator means having an indicator member movable relative to a zero position, electrical network means including a condition sensing means and reversible motor means in operative connection to said indicator member, effective upon sensing of a condition under measurement by said sensing means to produce operation of said reversible motor means in the direction to move said indicator member to a position indicating the value of the condition under measurement, and effective upon removal of the condition under measurement from said sensing means to produce operation of said reversible motor means in the direction to return the indicator member to zero position, said electrical network means further including a zero balance network having an adjustable device effective by adjustment of the latter for conditioning the network means to cause motor positionment of the indicator member in true zero position following removal of the condition under measurement from said sensing means, a second reversible electric motor in operative connection to said adjustable device, energizing circuit means for said second reversible electric motor, and means in control of said circuit means including a switch controlled by said indicator member only when the indicator member is in a predetermined off-zero range.

6. In a condition measuring system of the electrical network character described including an electric servo motor and a dial indicator in driven connection thereto, wherein the system in response to a condition under measurement causes servo motor operation to move said indicator from dial zero position to a dial position indicating the value of the condition under measurement, and in response to removal of the condition under measurement causes servo motor operation to return said indicator normally to dial zero position, said system being subject to electrical unbalance due to hysteresis and electrical drift effects therein, resulting in corresponding error operation of the servo motor which is reflected in servo motor return of the indicator only to an off-zero position upon system response to removal of the condition under measurement, adjustable means included in the system and effective by adjustment thereof to regulate the system such as to compensate for said electrical unbalance and thereby cause servo motor return of the indicator to dial zero position, electric motor means operable for effecting adjustment of said adjustable means, an energizing circuit for said electric motor means including control switch means, and means controlled by said indicator for operating said switch means.

7. In a condition measuring system of the electrical network character described including an electric servo motor and a dial indicator in driven connection thereto, wherein the system in response to a condition under measurement causes servo motor operation to move said indicator from dial zero position to a dial position indicating the value of the condition under measurement, and in response to removal of the condition under measurement causes servo motor operation to return said indicator normally to dial zero position, said system being subject to electrical unbalance due to hysteresis and electrical drift effects therein, resulting in corresponding error operation of the servo motor which is reflected in servo motor return of the indicator only to an off-zero position upon system response to removal of the condition under measurement, adjustable means included in the system and effective by adjustment thereof to regulate the system such as to compensate for said electrical unbalance and thereby cause servo motor return of the indicator to dial zero position, electric motor means operable for effecting adjustments of said adjustable means, an energiziing circuit for said electric motor means including circuit controlling electromagnetic switch means, an operating circuit for said switch means including two control switches in series in the operating circuit, means for closing one of said control switches only when said indicator is within a predeterrmined range of movement spanning its dial zero position, and means including a portion of said indicator for actuating the other control switch dependently upon the position of the indicator in said predetermined range of movement.

References Cited by the Examiner
UNITED STATES PATENTS

| | | | |
|---|---|---|---|
| 2,375,988 | 5/1945 | Gille | 324—99 |
| 2,404,342 | 7/1946 | Harrison | 324—100 |
| 2,882,035 | 4/1959 | Lauler | 177—10 |

WALTER L. CARLSON, *Primary Examiner.*

FREDERICK M. STRADER, *Examiner.*

A. C. WILLIAMS, J. J. MULROONEY,
*Assistant Examiners.*